United States Patent Office 2,828,271
Patented Mar. 25, 1958

2,828,271

METHOD OF FOAMING A PHENOL-FORMALDE-HYDE RESIN USING DIAZONIUM SALTS AS BLOWING AGENTS

Alma Patricia Armstrong and James Brisbane Cameron, Hayes, England, assignors to The Fairey Aviation Company Limited, Hayes, England, a company of Great Britain No Drawing. Application June 11, 1954
Serial No. 436,236

Claims priority, application Great Britain June 12, 1953

5 Claims. (Cl. 260—2.5)

This invention relates to expanded synthetic resins and is concerned with a method of forming an improved expanded or foam synthetic resin which lends itself conveniently to the moulding of articles of various shapes and is homogeneous and reliable in properties.

According to the invention a method of forming an expanded synthetic resin includes polymersing a mixture of a casting resin mix comprising a phenol and formaldehyde, with a diazonium salt as defined herein. The invention also includes an expanded synthetic resin so formed.

Numerous attempts have previously been made to produce synthetic resin foams but in general they have been subject to certain disadvantages. Many foams cannot easily be prepared to any desired shape or form since their manufacture requires high pressures, such as are only obtained in autoclaves, making difficult their use in complex double-curvature sandwich structures. Others give off toxic gases during foaming, rendering their use hazardous to operators. Again many foams are produced using extraneous materials which may be deleterious to dielectric properties, while others do not foam homogeneously or consistently, making structural weight estimation difficult. In general it is also found that such organic plastic foams are not resistant to moderately high temperatures.

An object of the present invention is to overcome some or all of these disadvantages.

Pure phenolic resins are relatively stable at moderately high temperatures, particularly when no organic filler such as cotton or wood flour is present, and such resins when cured should be able to withstand temperatures of 200° C.–250° C. for quite long periods.

A typical phenol formaldehyde casting resin, as manufactured, normally contains a large molar excess of formaldehyde, so that the resin becomes hydrophilic, and although water is chemically liberated in the final curing reactions, it is retained in the single liquid phase and is not physically liberated and can perform a useful function in accordance with the present invention. Moreover a phenolic casting resin can readily be hardened by the addition of acids and other acidic media.

It is known that certain diazo compounds, for example benzene diazonium sulphate, on treatment with water, liberate nitrogen with formation of a phenol and an acid. It is found that these diazonium salts are soluble in phenol formaldehyde casting resins, and hence the water liberated in the curing reaction of the resin, as referred to above, will react with the diazo compound, liberating nitrogen and forming phenol and an acid. Since the diazo compound is soluble in the resin, this gas will be liberated homogeneously throughout the mass. The phenol produced from the diazo compound will react further with the excess of formaldehyde in the resin, producing further resin, and the acid liberated will act as a further catalyst addition aiding the resin curing reaction.

The final result will be a thermosetting synthetic resin foam which will have a homogeneous density and which will foam consistently under constant conditions, giving exact replication of results. In addition since all by-products have been used up in the course of the reaction the resulting resin will be extremely pure. The foam will also be resistant to temperatures of the order of 200° C.–250° C.

THE FOAMING AGENT

For obtaining consistent results it is important that the diazonium salt used is reasonably pure or at least of known purity. The preferred salt, benzene diazonium sulphate, may be prepared in any well known way. For example in one way 40 millilitres of aniline are dissolved in 800 mils of isopropyl alcohol (dried, if possible) and 44 mils of concentrated sulphuric acid are poured in down the side of the flask very slowly with constant shaking. The aniline sulphate dissolves on shaking and the whole is cooled to about 30° C. 46 mils of amyl nitrite are added slowly, keeping the temperature between 25° C. and 35° C. The amyl nitrite is hydrolysed to nitrous acid, which reacts with the aniline sulphate to form benzene diazonium sulphate.

Side reactions are easily avoided, provided the solvent is reasonably dry. Anhydrous magnesium sulphate is effective in removing all water from the alcohol used.

The diazonium salt precipitates out from the reaction mixture, is filtered off, and washed with isopropyl alcohol to remove traces of decomposition products which are always present even under the best conditions.

Instead of benzene diazonium sulphate, benzene diazonium phosphate, which does not corrode steel, may be used as the foaming agent, and this can be prepared in the same way except that as aniline phosphate is quite insoluble in isopropyl alcohol it requires a much higher proportion of phosphoric acid in the solution to dissolve it.

Other diazonium salts may be employed of the type represented by the formula

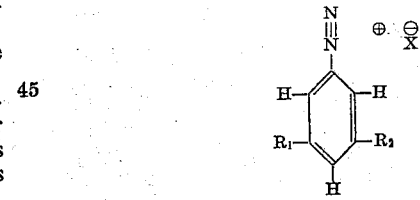

where X represents any acidic radical, and $R_1$ and $R_2$ represent almost any atomic grouping for example hydrogen, alkyl, aryl, hydroxy, alkoxy, aryloxy, nitro, amino, halogen, carboxylic acid or ester, or sulphonic acid grouping. They are however limited by steric and polar effects, in that they must be small enough or insufficiently active to permit of polycondensation in the benzene nucleus in positions ortho- and para- to the diazo grouping.

More highly substituted compounds can be used but preferably at least one ortho- or para-position is left free for polycondensation, but since the functionality of the resulting phenol is then reduced from three to two, or even one, the effect will be to reduce the temperature stability of the finished foam by plasticising the resin. If no ortho- or para-position is left free the foam may be thermoplastic.

The final restriction on the diazonium salt used is that it must be soluble in the casting resin mix, and must be stable for more than a convenient handling period, e. g. two hours, under ambient conditions.

Such a diazonium salt is referred to herein as "a diazonium salt as defined herein."

THE RESIN

Any suitable highly condensed acid-hardening phenol-formaldehyde casting resin mix may be used for the foam, including those made from homologues of phenol, provided they would give thermosetting resins. For a good foam structure it is better that the resin should have a viscosity of at least about 40,000 centipoises and for low density foams about 70,000 centipoises, but lower viscosities can be used, provided increased quantities of wetting agent are use, as indicated later.

USE OF FILLER

It is found that the bubbles of nitrogen formed for foaming may tend to agglomerate during the reaction, reducing the homogeneity of the product. This can partially be overcome by the addition of a finely divided filler the particles of which can act as nuclei on which the bubbles can form and remain separate.

Whilst many other fillers which will mix with the resin mix may be employed, the following examples have been found satisfactory, both from the point of view of density and homogeneity of the foam: wood flour, cork flour, diatomaceous silica, mica.

It should, however, be noted that the temperature stability of the product will depend to some extent on the temperature stability of the filler used, and in this respect mica will be better than wood flour.

The particle size of the filler is also found to effect the homogeneity of the foam. The smaller the particle size of the filler, the finer will be the texture of the foam. Particles which do not pass a B. S. 30 mesh sieve give foams too coarse. On the other hand, there appears to be no limit to the fineness of the particle used.

The use of a filler as described above is satisfactory for obtaining homogeneity of the foam if its density is greater than about 10 lb. per cubic foot but where the density of the foam is less than this the filler will not be sufficient because the surface tension of the resin is too high for small bubbles to remain discrete when the film of partially cured resin separating them is very thin.

However, the surface tension can be reduced by adding a very small quantity of a neutral wetting agent. The synthetic agent known as Lissapol N has been found to be satisfactory.

Using 3 or 4 drops (about .05 mil per drop) of this for every 100 grams of resin enables a foam of 1 lb. per cubic foot density to be made without the addition of a filler at all. However, the addition of a particular filler is desirable because it improves the mechanical properties.

It should also be realised that the resin viscosity has a considerable effect on bubble stability. The more viscous the resin the more stable the bubbles of gas.

CURING

The resin described above may be hardened by the addition of benzene sulphonic acid. Alternatively the following are generally suitable for hardening phenol formaldehyde casting resins:

Inorganic and organic acids, either aliphatic or aromatic, e. g. sulphuric acid, acetic acid, oxalic acid, p-toluene sulphonic acid. Alternatively metal chlorides may be used provided the dielectric properties of the resulting product are not of importance.

It is important that the rate of the curing reaction be sufficiently slow to give the foam time to expand fully and the main feature in this is the amount of acid catalyst added. Now benzene diazonium sulphate is an acid salt, and as such will promote curing even before decomposition. When foams lighter than 10 lb./cu. ft. are made the acid added in the foam of diazonium salt becomes significant, and the amount of catalyst added should be reduced accordingly. In fact, no catalyst at all should be added for foams lighter than about 6 lb./cu. ft.

DENSITY OF FOAM

In general the density of the foam can be decreased by:

(a) Increasing the proportion of foaming agent, which can, of course, only be taken to the limit of solubility of the diazonium salt in the resin.

(b) Increasing the curing temperature. This has also the secondary effect of increasing the cell size of the foam by normal thermal expansion of the nitrogen. In any case the temperature should be at least 50° C. to ensure that the curing is sufficiently rapid.

(c) Using a less highly condensed resin, which will give off more water, which can be volatilized and act as a foaming agent owing to the internal rise in temperature of the resin on curing. Reproducibility is more difficult to obtain in this case owing to the difficulty of controlling these temperature effects.

The invention may be carried into practice in various ways but some specific examples of methods of preparing foams embodying the invention will now be described.

Example 1

20 grams of the resin formerly available as Cataform 66/5EV, the trade name of a filled, acid-accelerated thermo-setting phenolic resin supplied as a viscous syrup by Catalin, Ltd., of Essex, England, 0.2 gram of 100 mesh beechwood flour filler, and 1 drop of a non-ionic alkyl phenol ethylene oxide condensate wetting agent sold by the Imperial Chemical Industries under the trade name of "Lissapol N," were heated to 90° C. in an oven in a paper carton and 2 grams of benzene diazonium sulphate were stirred in, dissolving in a few seconds. Foaming started in 15 seconds and curing was complete after 3 minutes. The resulting foam had a density of about 1.6 lb./cu. ft.

In general about one drop of this wetting agent for each 20 grams of resin should be used.

Example 2

The same materials, but with 1 gram of the filler and with foaming at 100° C. produced a foam with a density of about 2.2 lb./cu. ft.

The density may be increased by increasing the quantity of filler.

Example 3

The same materials as in Example 1 but with 1.2 grams of benzene diazonium sulphate and foaming at 100° C. (the resin mixture being heated to 80° C. before addition of the benzene diazonium sulphate) produced a foam with a density of 3.8 lb./cu. ft.

Example 4

300 grams of the same resin as in Examples 1 to 3, 2 grams of 100 mesh wood flour, 12 drops of Lissapol N and 17 grams of benzene diazonium sulphate were mixed at 45° C., and the mixture was poured into a metal mould 6" x 6" x 9" and put in an oven at 100° C. until curing was complete. A foam of 4.6 lb./cu. ft. density was produced.

The mould had hinged sides for removal of the cured foam. They were lined with cellulose acetate to prevent sticking, and a paper tray was put in the bottom of the mould to prevent leakage of resin.

Example 5

A resin was prepared by mixing:

150 gms. phenol
276 mils. 40% aqueous formaldehyde solution
2.25 gms. sodium hydroxide, boiling the mixture under reflux for one hour and then adding the following:

10.5 gms. lactic acid
24 mils. glycerol
6 gms. phthalic anhydride

Water was then distilled from this mixture at a temperature of 75° C., and a pressure of 5 mm. of mercury, until a viscosity suitable for casting was attained in the resultant mass.

100 grams of the resin, 1 gram of 120 mesh softwood flour, 4 grams of benzene diazonium sulphate, and 10 grams of benzene sulphonic acid were intimately mixed in the order given. The mixture stood for 30 minutes after mixing and was then poured into a mould preheated to 70° C. The mould was heated at 130° C. for 45 minutes and a foam of 12 lb./cu. ft. was produced.

The density of the foam can be decreased by decreasing the density and particle size of the filler, or by preheating the mould to a higher temperature, but not above about 120° C. at which temperature the foam may cure as it is poured.

Of course the resins used are only examples and other resins can be used with as good or better results.

By the methods outlined above it is possible to prepare foams from phenol-formaldehyde resin on a large scale, of densilties upwards from 2 lb./cu. ft. or even lower. The limit of usefulness for structural purposes appears to be about 2.5 lbs./cu. ft., and a density of about 4 lbs./cu. ft. is probably best for such uses as in radomes, for which this product is suitable. Foaming in situ offers no difficulties, and foams can be made in almost any size of vessel; this product may prove to be very useful in cases where very small spaces have to be filled with foam.

The lower density foams, from about 2.5 lbs./cu. ft. downwards, may be of considerable use as packaging foams.

What we claim as our invention and desire to secure by Letters Patent is:

1. The method of forming an expanded resin which comprises mixing (1) a partially precondensed phenol-formaldehyde resin mixture having at least two molecules of formaldehyde per molecule of phenol with (2) a diazonium salt having the formula

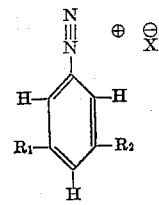

wherein X is an acidic radical and $R_1$ and $R_2$ are radicals selected from the group consisting of hydrogen, alkyl, aryl, hydroxy, alkoxy, aryloxy, nitro, amino, halogen, carboxylic acid, carboxylic ester and sulfonic acid, which salt is soluble in the resin mixture and sufficiently stable at room temperature to be handled, and heating for a time and temperature sufficient to cure the mixture whereby water is released during further condensation and reacts with said salt to form (a) nitrogen which causes the resin to foam, (b) a phenol which reacts with the excess formaldehyde and (c) an acid which aids in curing the resin mixture.

2. A method as claimed in claim 1 in which the resin mixture includes a filler.

3. A method as claimed in claim 1 in which the resin mixture is heated to a temperature in the range of 80–100° C. before addition of the diazonium salt.

4. The method of claim 1 wherein said diazonium salt is benzene diazonium sulfate.

5. The method of claim 1 wherein said diazonium salt is benzene diazonium phosphate.

References Cited in the file of this patent

UNITED STATES PATENTS

| | | |
|---|---|---|
| 1,500,844 | Plauson | July 8, 1924 |
| 2,448,155 | Richmond | Aug. 31, 1948 |
| 2,498,621 | Kropa et al. | Feb. 21, 1950 |
| 2,629,698 | Sterling | Feb. 24, 1953 |